United States Patent [19]

Sternberger et al.

[11] 4,186,397
[45] Jan. 29, 1980

[54] SHORT RANGE PRECISION NAVIGATION AND TRACKING SYSTEM AND METHOD THEREFOR

[75] Inventors: Wayne I. Sternberger, Peacedale; Lester R. LeBlanc, Narragansett, both of R.I.

[73] Assignee: Board of Regents for Education of the State of Rhode Island, Providence, R.I.

[21] Appl. No.: 830,408

[22] Filed: Sep. 6, 1977

[51] Int. Cl.² ............................................. G01S 9/04
[52] U.S. Cl. ................................. 343/7.5; 343/12 R; 343/14; 343/6.5 R
[58] Field of Search ............... 343/14, 7.5, 6.5 R, 343/12 R

[56] References Cited

U.S. PATENT DOCUMENTS

| | | |
|---|---|---|
| 3,246,322 | 4/1966 | Kuecken .......................... 343/6 R |
| 3,343,163 | 9/1967 | Crooks, Jr. et al. ............... 343/14 |
| 3,649,123 | 3/1972 | Ulicki .............................. 343/7.5 |
| 3,680,092 | 7/1972 | Scott ............................... 343/7.5 |
| 3,730,628 | 5/1973 | Wolcott et al. ................... 343/14 |
| 3,769,589 | 10/1973 | Buntschuh et al. ............... 343/12 R |
| 3,790,940 | 2/1974 | Becker ............................ 343/12 R |

OTHER PUBLICATIONS

*RCA COS/MOS Integrated Circuits,* Jul. 1977, pp. 150-153.

*Primary Examiner*—Maynard R. Wilbur
*Assistant Examiner*—Lawrence Goodwin
*Attorney, Agent, or Firm*—Thompson, Birch, Gauthier & Samuels

[57] ABSTRACT

A short range, precision navigation and tracking system and method therefor are disclosed. The navigation and tracking system utilizes a master-repeater configuration with a phase lock loop controlling the modulation frequency of the master FM transmitter.

16 Claims, 2 Drawing Figures

SHORT RANGE PRECISION NAVIGATION AND TRACKING SYSTEM AND METHOD THEREFOR

BACKGROUND OF THE INVENTION

The present invention relates to a method and apparatus for a high resolution, short range navigation and tracking system utilizing phase lock loop technology.

Current ocean engineering and oceanographic survey and data collection procedures require precision position location with a high degree of repeatability. Typical applications include precision seismic profiling surveys, cable placement, narrow channel navigation, and precision location of open sea bench marks.

Radio navigation in its present form nearly exclusively relies upon phase discrimination of various incoming signals and/or time measurements of round trip travel for a pulse or pulse series. Systems such as Loran C, Decca, and Omega are considered state-of-the-art for global navigation and more recently for estuary and confluence navigation.

Studies have noted serious limitations in all of the above systems. Errors appear to compound at a staggering rate from causes such as operator ineptness, receiver misalignment, synchronization errors, geodetic and geometric irregularities, and multipath signal receiption. In all, these considerations provide for adequate open water navigation. However, operation becomes questionable in confined channel lanes and for high resolution surveys.

It is accordingly a general object of the invention to provide an improved short range precision navigation and tracking system.

It is a specific object of the invention to provide such a system utilizing phase lock loop technology.

It is still another object of the invention to provide a short range precision navigation and tracking system that employs conventional audio quality telemetry equipment and modular, off-the-shelf components to minimize cost and maximize effectiveness.

It is a feature of the navigation and tracking system that operator interaction is minimal.

It is a further feature of the system that the cost per meter of accuracy is apparently lower than other presently available systems.

BRIEF DESCRIPTION OF THE INVENTION

The present invention is predicated on the concept that all frequencies (f), associated with electromagnetic wave propagation, have an associated wavelength ($\lambda$), given as a function of the velocity of propagation (c) of the signal in the medium $f\lambda = c$. Knowing this, one can achieve distance measurements by means of measuring the frequency corresponding to a signal whose wavelength of modulation is exactly twice the distance between an observer and a known point in space.

Pulsed carrier type ranging systems require the modulation bandwidths in order to detect and reconstruct the transmitted pulses. As is well known from Fourier theory, an impulse in the time domain is composed of all frequencies in the frequency domain. Generally, the accuracy of these systems will be determined by the system bandwidth. Frequency analysis of a pure sine wave yields a spectrum whose energy is concentrated at one frequency. In such a case, one would expect increased effectiveness due to an increased signal to noise ratio. Even though the modulation is at one frequency, this frequency covers a band determined by the system's range limits. This bandwidth, however, is still considerably narrower than that required by the pulsed carrier systems. In addition, narrow bands can be put on top of lower frequency carriers, with the obvious result of longer transmission range.

One must note that the velocity of propagation, considered thus far, has been that of electromagnetic waves in free space. In the real operational situation, this velocity will vary due to refraction. A simplified formulation for the determination of atmospheric refraction is derived from the Essen and Froome formula (Saastamoinen, 1967). These variations can be accounted for during data processing.

The concept described above is implemented in the present invention by using a master-repeater configuration to essentially "bend" or "fold" a waveform in the middle and have its end-points spatially coincide. In this case, the repeater unit becomes a simple retransmission station, where a signal received on carrier frequency one is retransmitted on carrier frequency two. In a dynamic system, where the repeater changes position relative to the master, adjustment of the frequency of the outgoing signal can achieve a constant phase relationship at the coincident end points. When this is done on a continuous basis, one has a continuous indication of the distance between master and repeater, by means of the frequency-wavelength relationship.

In the present invention this is achieved by the use of a phase locked loop (PLL) in a feedback circuit. The output of the PLL voltage controlled oscillator (VCO) is compared to the same waveform after it has been "delayed" by means of a telemetry loop.

The PLL provides all of the characteristics necessary for a dynamic system: constant phase lock, and variable modulation frequency, and adjustable narrow band filtering.

DESCRIPTION OF THE DRAWINGS

The object and features described above and other objects and features of the invention will best be understood from a detailed description of a preferred embodiment of the invention, selected for purposes of illustration and shown in the accompanying drawings, in which.

DETAILED DESCRIPTION OF THE PREFERRED EMBODIMENT OF THE INVENTION

Figure 1:
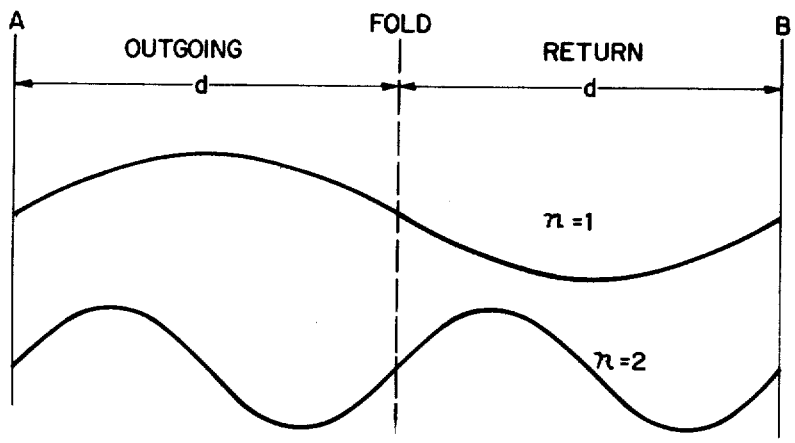
FIG. 1 is a round trip waveform diagram of the outgoing and return signals using an image technique about a "Fold" line that represents a repeater station; and, FIG. 2 is a block diagram of a Master station and a Repeater station.

Turning now to the drawings, FIG. 1 illustrates the round trip path of the modulation signal using an image technique about a "Fold" line. The distance d is the range between a "Master" station located on point "A" and a "Repeater" station located at the "Fold" line. The N=1 waveform depicts a modulation signal having a wavelength $\lambda$ equal to the round trip distance between the Master and Repeater stations. Waveform N=2 illustrates a modulation signal of twice the frequency of the N=1 signal.

It will be appreciated that when $n\lambda = 2d$; with n being an integer, then the round trip waveform endpoints are exactly $2\pi$ radians out of phase, or they appear to be in phase. If n=1 is a forced condition, then measurement of the frequency f of the signal directly yields the range distance:

$$d = c/2f \tag{1}$$

Figure 2:
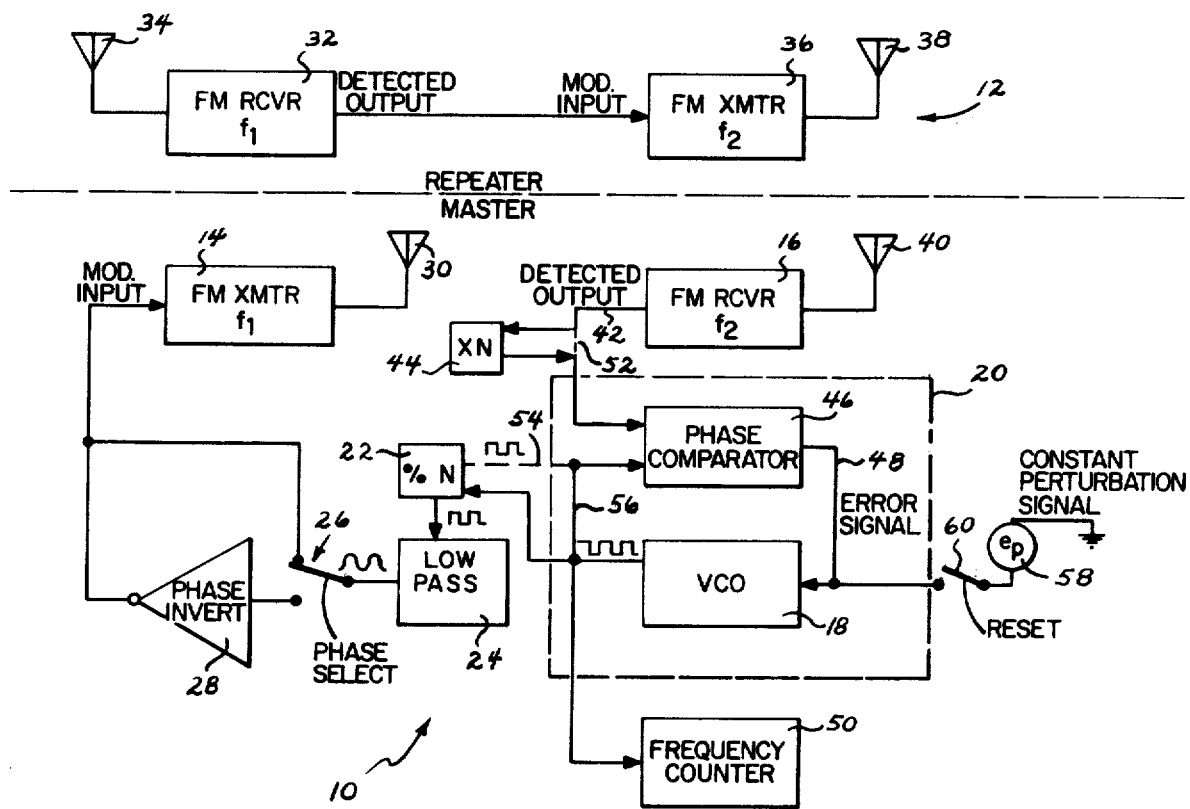

FIG. 2 illustrates in block diagram form the circuitry of a Master station 10 and a Repeater station 12. The Master station 10 uses conventional telemetry equipment comprising a frequency modulated transmitter 14 having a carrier frequency $f_1$ and a frequency modulated receiver 16 tuned to a different frequency $f_2$.

The modulation signal input to Master station transmitter 14 is derived from a voltage control oscillator (V.C.O.) 18 that is part of a phase locked loop (P.L.L.) 20. The square wave output from VCO 18 is divided by a ÷ N circuit 22 where N is any integer including 1. The divided square wave output from ÷ N circuit 22 is applied to a low pass filter 24 to convert the square wave input to a sine wave output. The sine wave output from low pass filter 24 is applied through a phase select switch 26 either directly to the Master station transmitter 14 or through a phase inverter 28.

The frequency modulated signal from transmitter 14 is transmitted through antenna 30 to the Repeater station 12 where it is received by receiver 32 through antenna 34. Repeater station receiver 32 is turned to the Master station transmitter frequency $f_1$. The detected output from the Repeater station receiver 32 is used as a modulation signal input to a Repeater station FM transmitter 36 that transmits a frequency modulated signal having a carrier frequency of $f_2$ through antenna 38.

The FM signal transmitted by Repeater station transmitter 36 is received by the Master station receiver 16 through antenna 40. The detected signal output from Master station receiver 16 appears on line 42 is applied to a xN circuit 44. N is any integer including 1. Preferably, the integer N selected for the ÷ N circuit 22 is also used as the integer N for the xN circuit 44.

The multiplied output from circuit 44 is applied as one input to a phase comparator 46 in P.L.L. 20. The other input to phase comparator 46 is obtained from the output of V.C.O. 18. Phase comparator 46 produces a voltage output error signal on line 48 that is used to adjust the frequency of the voltage controlled oscillator 18. When the phase of the voltage controlled oscillator output signal is locked to the phase of the detected Repeater station signal, the frequency of the V.C.O. provides a measure of the distance between the Master station and Repeater station in accordance with formula (1). The frequency of the V.C.O. is measured by a conventional frequency counter 50 which can be instrumented to provide a direct readout of distance.

It will be appreciated from the preceding discussion of the operation of the Master station transmitter and receiver that the frequency of the modulation signal applied to transmitter 14 will be equal to the frequency of the voltage controlled oscillator if N = 1 in the ÷ N circuit 22. However, in order to maintain accuracy and resolution, it is desirable to operate the V.C.O. 18 at a relatively high frequency while at the same time in order to minimize cost by using conventional telemetry equipment, it is desirable to employ a lower modulation frequency. Accordingly, in the preferred embodiment N is selected to be an integer greater than 1 so that the output from V.C.O. 18 is divided down to a lower frequency by the ÷ N circuit 22.

Other alternative circuits can be employed with respect to the phase lock loop 20. For example, the loop 20 can be used to lock onto a harmonic of the detected Repeater station signal if the multiplication circuit 44 is bypassed as indicated by the dashed lines 52. It is also possible to apply the divided down V.C.O. signal from ÷ N circuit 22 directly to the phase comparator 46 as indicated by the dashed line 54. In this case, line 56 would be opened.

In actual operation it is necessary for the operator to be able to force the system to lock at a given number of wavelengths. For instance, noise or interference may cause momentary loss of signal thus interrupting the phase locked loop's lock on the signal. When there is no "coherent" input to the phase comparator 46, the loop output will approach that of the free running V.C.O. In the case where the free running frequency is higher than the previously locked frequency, relock upon reestablishment of a signal, will likely be at a multiple wavelength.

"Forcing" of the signal is most easily accomplished for one wavelength round trip. One need only momentarily change the V.C.O. characteristics such that the wavelength of the signal produced exceeds the wavelength of the actual round trip. This is accomplished by applying a constant perturbation signal i.e. a D.C. level to the V.C.O. from a source 58 through reset switch 50. When the V.C.O. is returned to normal operation by open switch 60, the frequency will increase, and lock at the first occurance of a $2\pi$ radian phase shift. Thus, the ranging circuitry can be reset at will and initialized at the start of an operation without the need of returning to a calibration point.

Having described the circuitry of the short range precision navigation and tracking system of the present invention it will now be appropriate to discuss the design criteria for the system as well as various techniques for calibrating the system.

If one ignores instability of the phase locked feedback loop, the accuracy and resolution of the system become a function of the frequency counter characteristics. Design accuracy for counters, such as those employed in this study, is ± one count. With a gate of one second, the accuracy of the ranging system can be shown to be ± one Hertz, resolvable to the nearest unit value in frequency. Absolute accuracy and resolution are functions of the operating modulation frequency. A one Hertz change in frequency about 100 kHz. produces a change in λ, called α. At the same time, a one Hertz change relative to 10 kHz. produces a change in λ equal to 10 α.

Optimal accuracy precludes the use of a dynamic system. The master and repeater stations must be at a constant range during the period that the frequency is measured. Otherwise, a form of averaging will occur. Specifically, one will approximate the range at the midpoint of the counting cycle. Fortunately, with appropriate processing, this skewness can be eliminated from the data.

It was previously noted that consistent lock can only be assured at one wavelength's round trip. Therefore, one cannot directly take advantage of the increased resoltuion of multiple wavelength locking. At the same time, though, one must note the high modulation frequencies associated with the short ranges. Such high frequencies exceed the operating limits of most telemetry equipment. It appears that it is more advantageous to find a solution to the problem of operating at close ranges rather than improving the accuracy at far ranges.

One technique for solving the short range problem is the use of phase inversion for the modulation signal. This is accomplished by means of phase inverter 28. Alternatively, or in conjunction with the phase inventer 28, one can employ a lower modulation frequency through the use of the ÷ N circuit 22.

In the limiting case where N=1, since we can assure lock only at one wavelength, it becomes necessary for that one wavelength to appear to the phase comparator as a fractional part of a wavelength. For one wavelength, the signal at the repeater station 12 always appears at a $\pi$ radian phase relationship to the master. Assume the input to the master transmitter 14 were to appear at a $\pi$ radian relationship to the output of the loop. Then, the repeater would be forced to a $\pi/2$ radian relationship, and the round trip path would appear as one half wavelength travel. This is readily implemented by means of an inversion of the signal between the loop and the master transmitter provided by phase inverter 28. By use of this technique one maintains the capability of assured calibration and reset at the same time doubling the near range working effectiveness.

Until this point we have considered a system with no artificial delays outside of the round trip signal propagation delay. The very fact that one must use lengths of cable and peripheral components means that additional delays will, of necessity, be built into the system. The most noticeable effect of these additional delays is the suppression of the high frequency limit at small ranges. There are, however, three approaches which one can use in order to calibrate the system.

The first approach necessitates that one analyze each component of the system and determine the frequency-phase relationships. Knowing these relationships and the constant delays imposed by the lengths of interconnecting cable, one can solve for an overall frequency-time delay relationship.

The final two approaches are based on the knowledge that for a fully operative system, the frequency-range plot is a monotonically continuous curve. It is necessary, therefore, to perform just one curve fit and produce a unique polynominal interpolation for each unique ranging component configuration.

The calibration techniques require that frequency-range data be produced empirically and as accurately as possible. One way to accomplish this is to move the repeater station over a grid where each grid point is a known distance from the master station. An alternate, and final, approach is to simulate propagation delay of the return signal by means of a calibrated delay line.

The grid technique provides for the most realistic testing and calibration. Range limits for the telemetry equipment can be determined and movement of the repeater station will be of a continuous nature, simulating the actual tracking situation. These features may not, however, outweigh the fact that the procedure cannot be done in the lab, because of probably space limitations and the increased occurrence of multipathing in an enclosure.

The delay line procedure has the single distinct disadvantage of requiring calibration of the delay line. This requires careful laboratory analysis in order to obtain meaningful results. An error of $10^{-7}$ seconds in the calibration can produce an error of approximately 30 meters.

Having described in detail a preferred embodiment of our invention, it will now be apparent to those skilled in the art that numerous modifications can be made therein without departing from the scope of the invention as defined in the following claims. For example, although the preceding discussion has referred to frequency modulation techniques, the inventor can be implemented using amplitude modulations. In this case, AM transmitters and receivers are substituted for the corresponding FM transmitters and receivers shown in FIG. 2. In addition, one can use a delta arrangement with a single master station and two repeater stations using a ring-around transmission path.

What we claim and desire to secure by Letters Patent of the United States is:

1. A method for determining the distance between a master station and a repeater station comprising the steps of:
   (1) generating a continuous wave at a first carrier frequency;
   (2) modulating said continuous wave with a generated modulation signal to produce a modulated continuous wave;
   (3) transmitting the modulated continuous wave from a master station;
   (4) receiving said modulated continuous wave at a repeater station and retransmitting from the repeater station said modulated continuous wave at a second and different carrier frequency;
   (5) receiving said retransmitted modulated continuous wave at the master station;
   (6) recovering the modulation signal from said retransmitter modulated continuous wave;
   (7) establishing a predetermined phase relationship between the generated modulation signal and the recovered modulation signal;
   (8) comparing the phase relationship of said modulation signals;
   (9) adjusting the frequency of the generated modulation signal until said predetermined phase relationship is obtained;
   (10) determining the frequency of said generated modulation signal after said predetermined phase relationship is obtained, said frequency being a function of the distance between said master and repeater station; and
   (11) selectively reversing the phase of said generated modulation signal thereby increasing the near range working effectiveness.

2. The method of claim 1 wherein said predetermined phase relationship is an in phase relationship between the generated and recovered modulation signals.

3. A method for determining the distance between a master station and a repeater station comprising the steps of:
   (1) generating a continuous wave at a first carrier frequency;
   (2) generating a signal wave having a frequency f;
   (3) dividing the frequency f of the signal wave by N, where N is an integer greater than 1 to produce a modulation signal;
   (4) modulating said continuous wave with the modulation signal to produce a modulated continuous wave;
   (5) transmitting the modulated continuous wave from a master station;
   (6) receiving said modulated continuous wave at a repeater station and retransmitting from the repeater station said modulated continuous wave at a second and different carrier frequency;

(7) receiving said retransmitted modulated continuous wave at a master station;
(8) recovering the modulation signal from said retransmitted modulated continuous wave;
(9) establishing a predetermined phase relationship between the generated signal and a harmonic of the recovered modulation signal;
(10) comparing the phase relationship of said generated signal and said harmonic of the recovered modulation signal;
(11) adjusting the frequency of said generated signal until said predetermined phase relationship is obtained;
(12) determining the frequency of said generated signal after said predetermined phase relationship is obtained, said frequency being a function of the distance between the master and repeater stations; and,
(13) selectively reversing the phase of the modulation signal thereby increasing the near range working effectiveness.

4. The method of claim 3 further comprising the step of multiplying the frequency of the recovered modulation signal by N where N is an integer greater than 1 and is the same as the integer used for division of the generated signal and comparing the phase of the multiplied recovered modulation signal with the phase of the generated signal.

5. The method of claim 3 wherein said predetermined phase relationship is an in phase relationship between generated and the recovered modulation signals.

6. The method of claim 3 further comprising the step of multiplying the frequency of the recovered modulation signal by N, where N is an integer greater than 1 and comparing the phase of the multiplied recovered modulation signal with the phase of the generated signal.

7. A method for determining the distance between a master station and a repeater station comprising the steps of:
(1) generating a continuous wave at a first carrier frequency;
(2) generating a signal wave having a frequency f;
(3) dividing the frequency f of the signal wave by N, where N is an integer greater than 1 to produce a modulation signal;
(4) modulating said continuous wave with the modulation signal to produce a modulated continuous wave;
(5) transmitting the modulated continuous wave from a master station;
(6) receiving said modulated continuous wave at a repeater station and retransmitting from the repeater station said modulated continuous wave at a second and different carrier frequency;
(7) receiving said retransmitted modulated continuous wave at the master station;
(8) recovering the modulation signal from said retransmitted modulated continuous wave;
(9) establishing a predetermined phase relationship between the modulation signal and the recovered modulation signal;
(10) comparing the phase relationship of said modulation signal and said recovered modulation signal;
(11) adjusting the frequency of said generated signal until said predetermined phase relationship is obtained;
(12) determining the frequency of said generated signal after said predetermined phase relationship is obtained, said frequency being a function of the distance between the master and repeater stations; and,
(13) selectively reversing the phase of the modulation signal, thereby increasing the near range working effectiveness.

8. The method of claim 7 further comprising the step of multiplying the frequency of the recovered modulation signal by N, where N is an integer greater than 1 and comparing the phase of the multiplied recovered modulation signal with the phase of a harmonic of the modulation signal.

9. An apparatus for determining the distance between a master station and a repeater station comprising:
(1) means for generating a continuous wave at a first carrier frequency;
(2) means for generating a signal wave having a frequency f;
(3) means for dividing the frequency f of the signal wave by N, where N is an integer greater than 1 to produce a modulation signal;
(4) means for modulating said continuous wave with the modulation signal to produce a modulated continuous wave;
(5) means for transmitting the modulated continuous wave from a master station;
(6) means for receiving said modulated continuous wave at a repeater station and retransmitting from the repeater station said modulated continuous wave at a second and different carrier frequency;
(7) means for receiving said retransmitted modulated continuous wave at a master station;
(8) means for recovering the modulation signal from said retransmitted modulated continuous wave;
(9) means for establishing a predetermined phase relationship between the generated signal and a harmonic of the recovered modulation signal;
(10) means for comparing the phase relationship of said generated signal and said harmonic of the recovered modulation signal;
(11) means for adjusting the frequency of said generated signal until said predetermined phase relationship is obtained;
(12) means for determining the frequency of said generated signal after said predetermined phase relationship is obtained, said frequency being a function of the distance between the master and repeater stations; and,
(13) selectively reversing the phase of the modulation signal thereby increasing the near range working effectiveness.

10. The apparatus of claim 9 further comprising means for multiplying the frequency of the recovered modulation signal by N where N is an integer greater than 1 and is the same as the integer used for division of the generated signal, and with said phase comparison means comparing the phase of the multiplied recovered modulation signal with the phase of the generated signal.

11. The apparatus of claim 9 wherein said means for generating a signal includes a voltage controlled oscillator and wherein said phase comparison means includes a phase comparator that produces a voltage output as a function of the phase relationship between the two signal inputs thereto, said voltage controlled oscillator and phase comparator comprising a phase lock loop.

12. The apparatus of claim 11 further comprising means for selectively applying a voltage level to said voltage controlled oscillator to drive the frequency of said oscillator below the frequency that has a wavelength equal to the round trip distance between the master station and the repeater station.

13. An apparatus for determining the distance between a master station and a repeater station comprising:
  (1) means for generating a continuous wave at a first carrier frequency;
  (2) means for modulating said continuous wave with a generated modulation signal to produce a modulated continuous wave;
  (3) means for transmitting the modulated continuous wave from a master station;
  (4) means for receiving said modulated continuous wave at a repeater station and retransmitting from the repeater station said modulated continuous wave at a second and different carrier frequency;
  (5) means for receiving said retransmitted modulated continuous wave at the master station;
  (6) means for receiving said retransmitted modulated continuous wave at the master station;
  (7) means for establishing a predetermined phase relationship between the generated modulation signal and the recovered modulation signal;
  (8) means for comparing the phase relationship of said modulation signals;
  (9) means for adjusting the frequency of the generated modulation signal until said predetermined phase relationship is obtained;
  (10) means for determining the frequency of said generated modulation signal after said predetermined phase relationship is obtained, said frequency being a function of the distance between said master and repeater station; and,
  (11) means for selectively reversing the phase of said generated modulation signal thereby increasing the near range working effectiveness.

14. An apparatus for determining the distance between a master station and a repeater station
  (1) means for generating a continuous wave at a first carrier frequency;
  (2) means for generating a signal wave having a frequency f;
  (3) means for dividing the frequency f of the signal wave by N, where N is an integer greater than 1 to produce a modulation signal;
  (4) means for modulating said continuous wave with the modulation signal to produce a modulated continuous wave;
  (5) means for transmitting the modulated continuous wave from a master station;
  (6) means for receiving said modulated continuous wave at a repeater station and retransmitting from the repeater station said modulated continuous wave at a second and different carrier frequency;
  (7) means for receiving said retransmitted modulated continuous wave at a master station;
  (8) means for recovering the modulation signal from said retransmitted modulated continuous wave;
  (9) means for establishing a predetermined phase relationship between the modulation signal and the recovered modulation signal;
  (10) means for comparing the phase relationship of said modulation signal and said recovered modulation signal;
  (11) means for adjusting the frequency of said generated signal until said predetermined phase relationship is obtained;
  (12) means for determining the frequency of said generated signal after said predetermined phase relationship is obtained, said frequency being a function of the distance between the master and repeater stations; and,
  (13) means for selectively reversing the phase of the modulation signal, thereby increasing the near range working effectiveness.

15. A method for determining the distance between a master station and a repeater station comprising the steps of:
  (1) generating a continuous wave at a first carrier frequency;
  (2) generating a signal wave having a frequency f;
  (3) dividing the frequency f of the signal wave by N, where N is any integer to produce a modulation signal;
  (4) modulating said continuous wave with the modulation signal to produce a modulated continuous wave
  (5) transmitting the modulated continuous wave from a master station;
  (6) receiving said modulated continuous wave at a repeater station and retransmitting from the repeater station said modulated continuous wave at a second and different carrier frequency;
  (7) receiving said retransmitted modulated continuous wave at a master station;
  (8) recovering the modulation signal from said retransmitted modulated continuous wave;
  (9) multiplying the frequency of the recovered modulation signal by N, where N is an integer greater than 1;
  (10) establishing a predetermined phase relationship between the generated signal and the multiplied recovered modulation signal;
  (11) comparing the phase relationship of said generated signal and said multiplied recovered modulation signal;
  (12) adjusting the frequency of said generated signal until said predetermined phase relationship is obtained;
  (13) determining the frequency of said generated signal after said predetermined phase relation is obtained, said frequency being a function of the distance between the master and repeater stations; and,
  (14) selectively reversing the phase of the modulation signal, thereby increasing the near range working effectiveness.

16. A method for determining the distance between a master station and a repeater station comprising the steps of:
  (1) generating a continuous wave at a first carrier frequency;
  (2) generating a signal wave having a frequency f;
  (3) dividing the frequency f of the signal wave by N, where N is any integer to produce a modulation signal;
  (4) modulating said continuous wave with the modulation signal to produce a modulated continuous wave;
  (5) transmitting the modulated continuous wave from a master station;

(6) receiving said modulated continuous wave at a repeater station and retransmitting from the repeater station said modulation continuous wave at a second and different carrier frequency;

(7) receiving said retransmitted modulated continuous wave at the master station;

(8) recovering the modulated signal from said retransmitted modulated continuous wave;

(9) multiplying the frequency of the recovered modulation signal by N, where N is an integer greate than 1;

(10) establishing a predetermined phase relationship between a harmonic of the modulation signal and the multiplied recovered modulation signal;

(11) comparing the phase relationship of said harmonic of the modulation signal and said multiplied recovered modulation signal;

(12) adjusting the frequency of said generated signal until said pretermined phase relationship is obtained;

(13) determining the frequency of said generated signal after said predetermined phase relationship is obtained, said frequency being a function of the distance between the master and repeater stations; and,

(14) selectively reversing the phase of the modulation signal, thereby increasing the near rane working effectiveness.

* * * * *